United States Patent [19]

Manchak

[11] 4,079,003

[45] * Mar. 14, 1978

[54] METHOD OF TRANSFORMING SLUDGE INTO ECOLOGICALLY ACCEPTABLE SOLID MATERIAL

[76] Inventor: Frank Manchak, 731 El Rancho Rd., Santa Barbara, Calif. 93108

[*] Notice: The portion of the term of this patent subsequent to Jun. 7, 1994, has been disclaimed.

[21] Appl. No.: 691,855

[22] Filed: Jun. 1, 1976

Related U.S. Application Data

[63] Continuation-in-part of Ser. No. 406,349, Oct. 15, 1973, Pat. No. 4,028,240.

[51] Int. Cl.² .............................................. C02C 3/00
[52] U.S. Cl. ...................................... 210/46; 210/10; 210/56; 210/64; 210/71
[58] Field of Search ...................................... 71/11-13, 71/2 S, 64 SC; 208/13; 210/10, 42 R, 59, 65-67, 170, 50, 64, 71, 46, 49, 56, 48

[56] References Cited

U.S. PATENT DOCUMENTS

| | | | |
|---|---|---|---|
| 2,297,195 | 9/1942 | Behringer | 71/2 S |
| 3,342,731 | 9/1969 | Baumann et al. | 210/10 |
| 3,476,683 | 11/1969 | Liljegren | 210/66 |
| 3,796,658 | 3/1974 | Meissner | 210/65 |
| 4,028,240 | 6/1977 | Manchak | 210/59 |

*Primary Examiner*—Thomas G. Wyse
*Attorney, Agent, or Firm*—William C. Babcock

[57] ABSTRACT

Sludges in the form of aqueous suspensions of organic and inorganic materials that range in viscosity from thick viscous pastes to flowable liquids are produced in the operation of numerous industries and also as waste by municipalities. The apparatus and method of using the same that are the subject of the present invention are directed to transforming the sludge to solids both in sumps in which they may be situated as well as apart from such sumps or storage areas or from continuous sources. The apparatus of the present invention as aqueous sludge is sequentially removed from a sump, storage area, or from continuous sources mixes calcium oxide therewith at a predetermined rate within a confined space. The predetermined rate is such that the exothermic reaction between the calcium oxide and water in the sludge raises the temperature of the sludge-calcium oxide mixture to the extent that substantial steam is produced. The predetermined rate is also such that substantial hydrolysis and saponification of the sludge occurs, and the PH of the sludge-calcium oxide mixture being not less than 12.4. The elevated temperature that occurs in the confined space and the high pH results in the destruction of virus and bacteria in the sludge, and the almost instant destruction of objectionable odors from the sludge. The transformed sludge is in a solid particled state that can be compacted for construction and land fill purposes, and when neutralized may be used for agricultural purposes. Toxic compounds of metals such as cadmium, chromium, arsenic, zinc and the like that were initially present in the sludge are transformed into insoluble compounds by the high pH previously mentioned, and as a result these metals will not leach out when the transformed sludge is used for landfill, roadfill construction or agricultural purposes, and other end uses presently being developed.

15 Claims, 16 Drawing Figures

METHOD OF TRANSFORMING SLUDGE INTO ECOLOGICALLY ACCEPTABLE SOLID MATERIAL

CROSS-REFERENCE TO RELATED APPLICATION

The present application is a continuation-in-part of my copending application Ser. No. 406,349 filed Oct. 15, 1973 entitled, "METHOD AND APPARATUS FOR TREATING SUMPS", now U.S. Pat. No. 4,028,240.

BACKGROUND OF THE INVENTION

1. Field of the Invention

Method of Using Same to Transform Sludge into an Ecologically Acceptable Material.

2. Description of the Prior Art

In the past, it has been known that quick lime and slacked lime have a tendency to solidify sewage sludge, organic sludge including oil waste, and marine silt when mixed therewith. However, prior to the present invention no apparatus has been available to mechanically mix metered quantities of calcium oxide with viscous asphalt-like material when it is in a sump to cause the solidification thereof, and the solidified material having toxic compounds of metals such as cadmium, chromium, arsenic and zinc locked therein in an insoluble form.

Likewise, prior to the present invention no known process or apparatus has been available by which hydrocarbon bearing sludges and hazardous marine silt as well as sewage sludge or other toxic sludges containing a substantial quantity of water is sequentially subjected to the action of calcium oxide at a metered rate in a confined space to initiate an exothermic reaction in which the temperature of the sludge-calcium oxide mixture rises with the evolution of substantial quantities of steam. Neutralization, agglomeration and base exchange occurs in the confined space as the exothermic reaction proceeds, with the pH of the sludge-calcium oxide mixture rising to at least 12.4. As the calcium oxide dissolves in the aqueous sludge, dehydration of the sludge occurs with an increase in temperature and bacteria and virus present in the sludge are destroyed due to this increase in temperature and the high pH of the resulting calcium oxide sludge mixture are destroyed. The calcium oxide as it dissolves results in the formation of hydrates that tend to bind solid particles in the sludge together to form agglomeration of particles. The increase in pH previously mentioned results in soluble toxic salts of the metals previously mentioned being transformed into insoluble compounds. The reaction product discharges from the confined space as relatively hard friable particles that are still hot and steaming, and substantially free of odor, and that have toxic metals locked therein in an insoluble form. The reaction product retains a substantial quantity of initially present water as an integral part thereof. The reaction product may be compacted and is suitable for landfill, road bed use, and, if neutralized, may be used for agricultural and other purposes, A major object of the present invention is to provide a method that in conjunction with calcium oxide may be used to solidify the contents of oil sludge sumps, and also process and apparatus that is adapted to have sludge of industrial or municipal origin, as well as hazardous marine silt, discharged thereto to be transformed into solid ecologically acceptable material.

SUMMARY OF THE INVENTION

In FIGS. 1 to 13 inclusive, a first form of apparatus is shown in which calcium oxide may be intimately mixed in desired quantities with an aqueous oil sludge mixture in an oil sludge sump to transform the aqueous oil sludge mixture into a solid reaction product that has toxic materials locked therein in an insoluble form.

Figure 14:
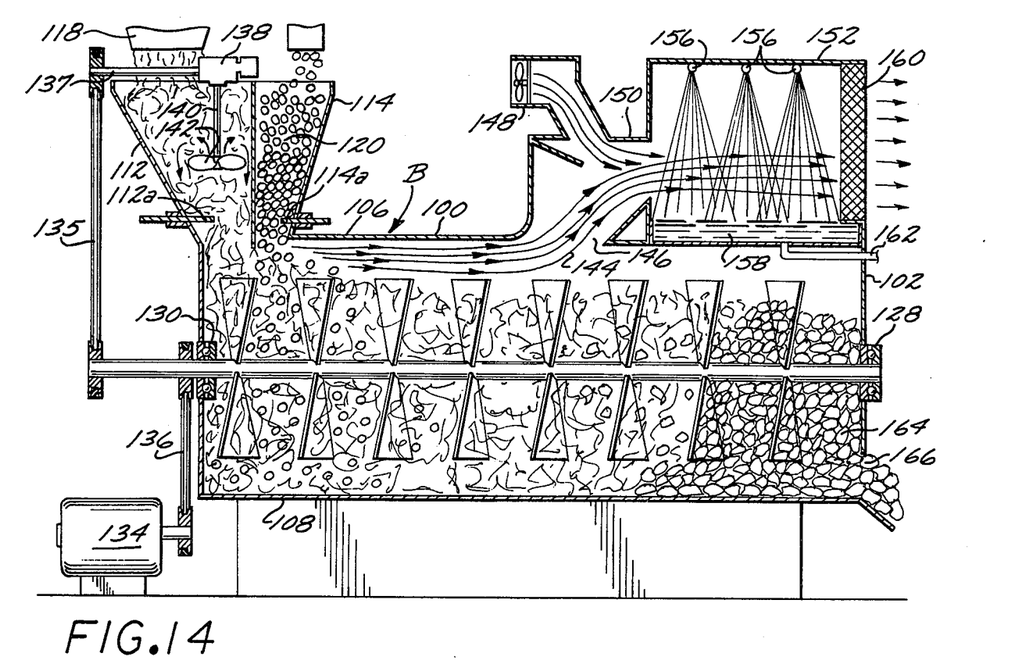
FIG. 14 is a diagrammatic view of a second form of apparatus for transforming aqueous sludge into a solid friable reaction product.

A second form of apparatus is shown in FIG. 14 in which aqueous sludge is sequentially delivered thereto to mix with calcium oxide in a confined space to be transformed into a reaction product due to an elevated temperature, hydrolysis and saponification that is hard and fiable and can be compacted for road bed purposes, land fill, or agricultural and other purposes when neutralized.

The second form of the apparatus shown in FIG. 14 is illustrated as mounted on a barge to receive silt from a dredge and deliver the reaction product to an adjoining barge.

DESCRIPTION OF THE PREFERRED EMBODIMENT

Figure 1:
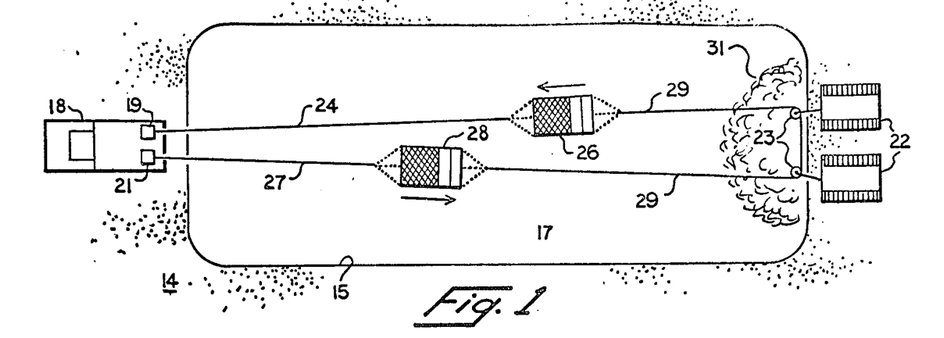
FIG. 1 is a plan view of a sump being treated by two scoops attached to drag lines wherein one end of the generally parallel drag lines passes through pulleys and the other end is attached to a winch truck.

A quantity of calcium oxide is dumped at the right end of the sump pit 15 to form the pile 31, and the scoops 26 and 28 are operated to pick up this lime and inject it into the sump contents 17 by moving through the sump, preferably below the surface, and distributing the calcium oxide as the scoops move. As illustrated in FIG. 1, the scoop 26 is moving to the left or in the forward direction, whereas the scoop 28 is moving to the right in an empty condition to pick up additional lime from the pile 31. The scoop 26 returning may be manipulated so as to form a minimum resistance, and may be elevated above the surface of the sump by the tautness of the lines 27 and 29, or by regulating the harness 48 as may be seen in FIG. 4, the scoop may be caused to be skidded across the surface of the sump on its rear end.

Figures 2, 3, 4, 5:
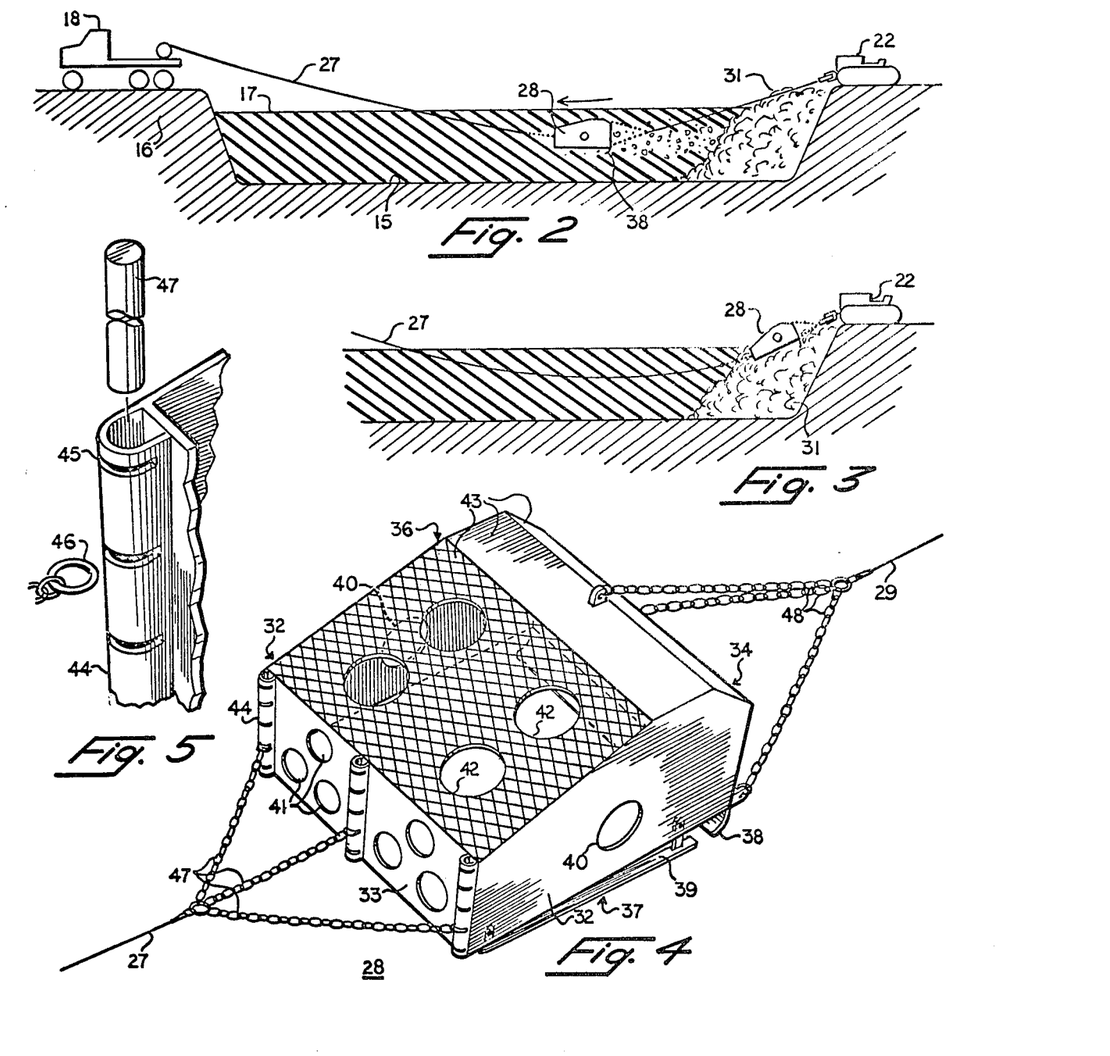
FIG. 2 is a sectional view through the sump of FIG. 1 showing one of the scoops being moved to the left to distribute the calcium oxide throughout the body of the sump material.
FIG. 3 is a fragmentary sectional view of the same sump as in FIG. 2, but showing the scoop being positioned over a pile of calcium oxide so that it is being loaded for subsequent movement through the sump materials, as shown in FIG. 2.
FIG. 4 is a three-dimensional view of a presently preferred form of the scoop for disbursing calcium oxide through the body of the sump material.
FIG. 5 is an exploded view of the left-hand corner of the scoop of FIG. 4 showing the construction of the U-shaped tube that is transversely slotted so that rings can be passed into the slots and held by means of a rod passing into the U-shape and through the rings.
Figure 6:
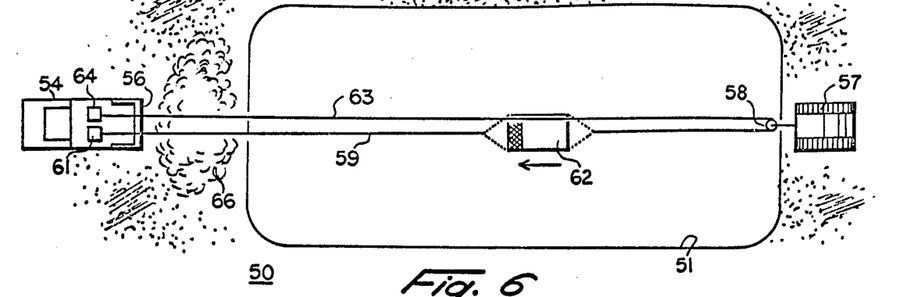
FIG. 6 is a plan view of a sump wherein a single scoop is moved by means of a conventional drag line arrangement.
Figure 7:
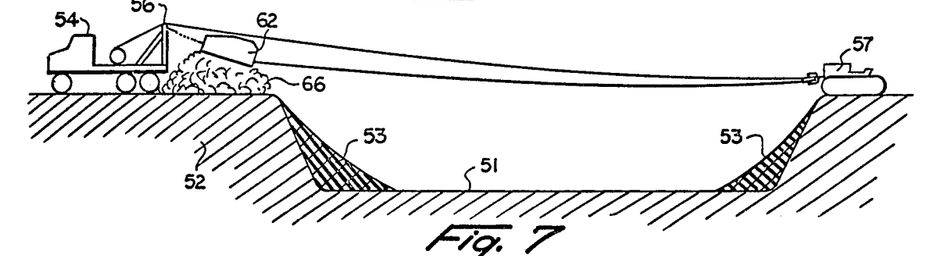
FIG. 7 is a sectional view of the sump of FIG. 6 showing the contents of the sump largely removed by means of a drag line scoop which deposits the material adjacent to the prime mover or winch truck.

The action of the scoop 28 in injecting calcium oxide into the sump contents 17 is shown in FIG. 2. There it will be noted that the blade 38 causes the sump contents to be rolled or swirled to the interior of the scoop 28 and at the same time the apertures 41 in the front of the scoop 28 allow the sump contents to move through the scoop to also pick up oxide that is located there. When the scoop 28 has finished its travel to the left to the winch truck 18 the entire contents will be injected into the sump contents and distributed along the path of travel.

The action in loading the scoop is illustrated in FIG. 3 wherein the scoop 28 is lifted above the surface of the pile of lime 31 and then dropped down upon it, and the weight of the empty scoop 28 causes it to enclose a quantity of lime oxide that is then distributed, as illustrated in FIG. 2, throughout the sump contents. The lime oxide 31 is dumped in large quantities at one end of the sump pit 15 to form a pile 31.

Referring to FIGS. 6 through 9, there is illustrated the method of dredging out a sump after it has been treated with calcium oxide and there is illustrated also a preferred form of scoop for effecting this dredging or drag line operation. A sump 50 is formed by a pit 51 dug into earth 52 and the pit contents are designated by numeral 53. Positioned at one end of the pit 51 is a winch truck 54 which may be identical to the winch truck of FIGS. 1 and 2 with the exception that here it is desirable to have a pulley tower 56 formed on the end of the truck so that the scoop operated may be elevated 8 or 10 feet off the surface of the ground to improve the ability of piling the dredged material. Disposed on the right end of the pit 51 is an anchor 57, preferably in the form of a crawler type tractor, to which a pulley 58 may be connected.

Stretching between the anchor 57 and the winch truck 54 is a drag line 59 connected at one end to a winch 61 on the truck and the other end of which is connected to a scoop 62. The drag line consists of another segment 63 connected to the right end of the scoop 62 and passing through the pulley 58 to return to a winch 64 on the winch truck. Referring particularly to FIG. 2 there is illustrated the dumping operation whereby the scoop 62 is elevated above ground level so that its contents fall by gravity out of the open bottom of the scoop and form a pile 66. This dredging is done by conventional drag line techniques and consists of returning the bucket 62 to the anchor 57, whereupon sufficient slack is allowed so that the bucket 62 drops by gravity onto the sump contents 53 and pulling of the scoop 62 toward the winch truck 54 picks up a load of the sump contents and when the bucket is elevated, as shown in FIG. 2, the contents drop out.

Figure 8:
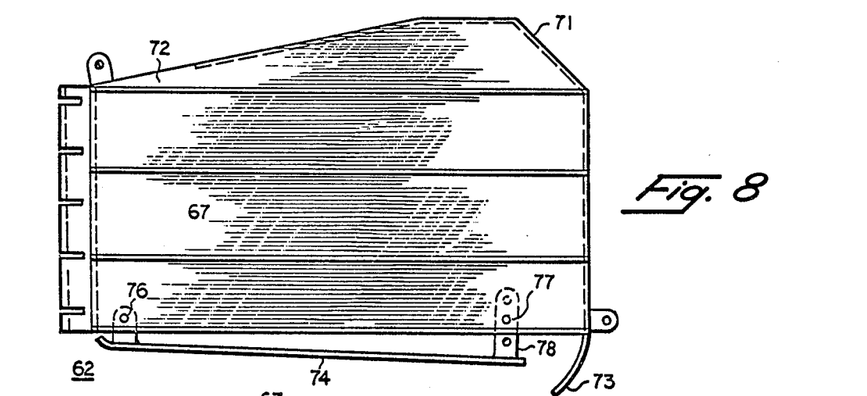
FIG. 8 is an elevational view of a presently preferred embodiment of the scoop of FIGS. 6 and 7 used for ordinary dredging, as contrasted to mixing as shown in FIGS. 1 through 4.
Figure 9:
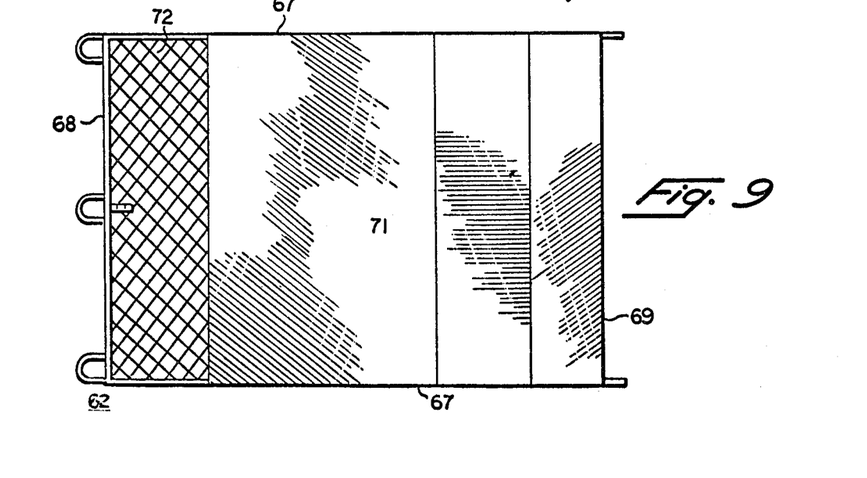
FIG. 9 is a top view of the scoop of FIG. 8 showing the left-hand or front portion of the top being comprised of mesh or expanded metal that permits water to escape.
Figure 10:
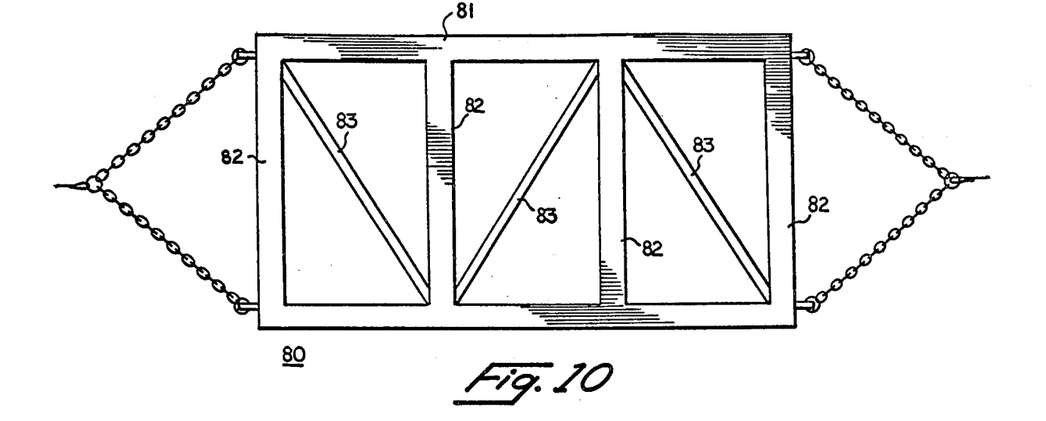
FIG. 10 is a plan view of a combined leveler and scraper which is used for treatment of the sumps.

Illustrated in FIGS. 8 and 9 are views of the bucket 62 showing its construction. Not only can this bucket be used for removal of the contents of sumps, but it can also be used in ordinary dredging wherein material is removed from the bottom of lakes, rivers, oceans, etc. The bucket 62 has sidewalls 67 which may be suitably reinforced with outwardly projecting ribs and may have a front 68 and a rear 69. The scoop 62 has a top 71 which is generally solid, except at the forward end, about 10% of the area of the top is formed of mesh 72 which may be expanded metal and preferably the greatest dimension of the mesh is less than 4 inches. This mesh allows the escape of water when dredging extremely liquid materials, or when dredging the bottoms of lakes and rivers. The bottom of the scoop 62 is preferably open and at the rear edge thereof is located a curved blade 73 which scoops up material to deposit it on the interior of the scoop. The depth of cut of the blade 73 is determined by its vertical dimension, but lesser cuts may be made by virtue of a skid 74 on each side of the bucket which is pivoted at the front at 76 and which has an adjustable depth setting by a bolt 77 passing through one of a plurality of holes in an upright support 78. The elevation view of the scoop 62 is shown in FIG. 8 and the scoop may have a hump back design if desired, whereby the rear portion of the scoop has a greater capacity than the front portion to accommodate the scooping action of the blade 73. The scoop 62 may be harnessed to drag lines in the same fashion as the scoops of FIGS. 1 through 4 as shown in detail in FIG. 4.

Figure 11:
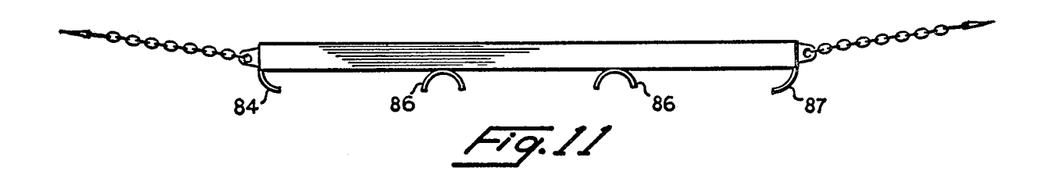
FIG. 11 is an elevational view of the combined scraper and leveler of FIG. 10.

Illustrated in FIGS. 10 through 13 is a scraper which is also useful as a leveler in treating sumps. A scraper 80 may be formed of a rectangular frame 81 which may be conveniently made by welding tubular steel together. The frame may have cross bars 82 and diagonal braces 83. Welded or otherwise secured to the bottom of each cross bar 82 is a pipe segment and a forward or left-hand segment in FIG. 11 may be a quarter section of a pipe which points toward the rear of the frame and is designated by the numeral 84. The two center cross bars 82 may have a semi-circular pipe welded or otherwise secured to them designated by the numeral 86. At the rear or right in FIG. 11 is another quarter section of pipe pointing towards the front, designated as 87.

Figure 12:
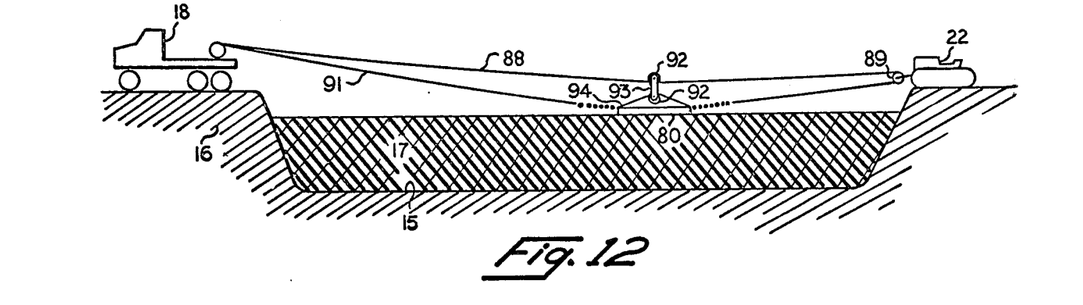
FIG. 12 is an elevational view of a sump wherein a drag line has been established for pulling the scraper of FIGS. 10 and 11 and wherein the height is controlled by a pulley support for the scraper which rides along the upper line of the drag line pair.
Figure 13:
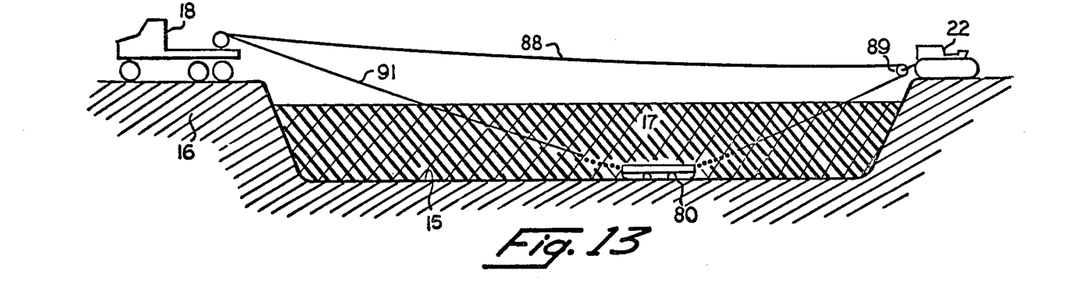
FIG. 13 is a view of the same sump as shown in FIG. 12, wherein the combined leveler and scraper is used to scrape the bottom of the sump pit to loosen all sump contents for thorough mixing.

When it is desired to use the scraper or leveler, the scoop is disconnected from the drag line and the device 80 is substituted for it. Shown in FIGS. 12 and 13 are uses of this device, first as a leveler, in FIG. 12, and as a scraper, in FIG. 13. Referring to FIG. 12, the winch truck 18 may have a drag line 88 which passes through a pulley 89 at the anchor 22 at the right edge of the sump pit 15. The combined leveler and scraper 80 is secured to one end of the drag line 88 and the other end is secured to a drag line 91 connected to the other winch of the prime mover 18. The elevation of the leveler 80 is maintained by means of a pair of pulleys 92 joined by a cross bar 93 and the lower pulley 92 has a wire rope 94 passing over it connected to each end of the leveler 80. In this fashion the operator of the winch truck 18 maintains the level of the leveler 80 as it is pulled across the surface of the sump contents 17. This leveling is desirable for the curing of the sump contents after calcium oxide has been mixed with the contents.

Shown in FIG. 13 is the use of the device 80 as a scraper. Frequently, in sumps the bottom layers of the materials are hard and dense and are not fluid and plastic as are the upper layers. Accordingly, it is necessary to scrape these loose from the bottom of the pit 15 so that lime oxide might be mixed with these contents. The scraper 80 is sufficiently heavy so that it will drop by gravity through the pasty or semifluid layer of the sump contents 17 whereupon it may be dragged across the harder sump contents and will break these loose from the bottom so that thereafter they can be worked by the scoops to distribute calcium oxide as described with reference to FIGS. 1 through 5. The scraper 80 is moved back and forth in accordance with conventional drag line techniques by the operator of the winch truck operating the drums or winches associated with the two drag line segments 88 and 91. Under some conditions the scraper may dig into the bottom of the pit and other conditions may give rise to layers spaced from the bottom. For these cases, the scraper 80 may be held at any desired level by lengthening the bar 93 or substituting a wire rope for the bar so that the rope 88 will be above the sump level while supporting the scraper 80 below the sump surface.

Although the action of lime on certain earth materials has been known for centuries in the making of mortars and cements, the use of lime on the bituminous contents of oil well sumps has been little appreciated. The lime acts to stiffen up the contents of the sumps and permit the handling of the sump contents so stiffened as regular earth materials are handled. The contents of a sump are normally very soupy or at best pasty and their handling by any conventional material handling process has heretofore been impractical. In practicing the present invention the free-standing water is first drawn off. Frequently this water occurs as a layer on top of the oil well sumps, but also it may be disbursed throughout the body of the sump contents. In severe cases a trench has to be dredged through the center of the sump contents to allow water to accumulate in a specific area so that the water can be pumped off. The method of injecting calcium into the sump contents described with reference to FIGS. 1 through 4 is best accomplished when the sump contents are in a pasty or soupy condition of a very stiff soup. If the sump contents are harder than a paste, then water has to be added to the sump to soften it up so that the machinery of FIGS. 1 through 4 can be operated to inject calcium into the contents.

The first action of the lime in the sump contents is a violent steaming and boiling action as the lime reacts with the water present. The lime must be carried down below the surface of the sump so that this violent reaction between the quicklime and the water will permit mixing of the materials with the quicklime. This mixing action is continued until the sump contents noticeably stiffen. The amount of lime needed for a sump varies from 1-½% to 5% by weight of its contents, but for spreading in thin layers not more than one foot thick, the lime can be as low as ½%. The sump contents typically weigh about 2500 pounds per cubic yard.

The reaction of the lime on the clay contents of the sump, such as the various drilling muds, is to first break up the clods and hard aggregate of drilling mud which sometimes occurs. The action of the lime on very soupy clay is to stiffen it up. The net effect of these two actions on clay is to make the entire clay contents manageable.

After the lime has been injected in the oil sump contents in the required amount, the sump is preferably leveled, as shown in FIG. 12, and allowed to stand for about 48 hours. This time period allows the lime to react with the contents in the sump. This reaction consolidates the bituminous portions of the sump contents as well as the various chemicals and additives that are usually dumped into sumps from the treatment of oil wells. Calcium oxide in granules about the size of wheat kernels is presently preferred.

After the 48 hour or two day waiting period, the sump contents are dredged up or dug up by means of a drag line, as shown in FIGS. 6 through 9, or by other suitable earth-moving techniques. Usually, however, the stiffened up contents are still too moist and sticky to be worked by conventional earth-moving equipment, such as bulldozers. The dredged up material is spread out for drying for a period of several weeks until it is dry enough to handle by regular earth-moving equipment. The spreading should be done in layers not more than 3 feet thick. The drying should be terminated at the end of three weeks, as thereafter the material starts to cement together, and four weeks is probably a maximum. Thereafter the material may be moved to any suitable location and compacted for fill. The action of the lime on the sump contents as fill material is extremely beneficial. The lime reacting with the contents tends to seal off the mixture so that it will not be leached by water. Indeed, thoroughly compacted fill made of this lime treated sump contents appears to shed water that may come from above as by rain and appears to be impervious to ground water which may occur below the fill. This sealing off tendency of the lime is especially desirable where there is any poisonous type of materials in the sump contents, thus preventing these materials from entering the ground water or the runoff water to avoid poisoning or pollution of streams and water supplies. The cementing and sealing off action seems to be permanent.

The reaction of the calcium oxide appears to be first, the reaction agglomerates the sump waste materials into course, friable particles through a phenomenon called base exchange, and secondly, it produces a definite well disbursed treatment and does not interfere with the growing crops. Sufficient acid must be added to result in a pH number no higher than 8.5.

On some occasions there is need for great haste in eliminating sumps, as when an oil field lease is terminating, or for other reason the sump has to be eliminated rapidly. In this case, extreme care is taken to draw off all water that can be removed from the contents of the sump and thereafter an excess of calcium oxide is injected into the sump contents up to 5% by weight. This amount reduces the water content to the compaction range of 15% to 40% water content. Sump mixtures of 10% to 15% water content appear to be bone dry during manual handling. This excess results in dehydration of the sump contents, as well as stiffening the contents. The injection of calcium oxide must proceed rapidly so that the required amount can be injected before the stiffening occurs and makes impractical the use of further injection. When successfully carried out the contents are stiff enough to be handled by bulldozers, in which case the material can be moved to one side and then laid in rows and compacted in place without first removing the contents fom the sump itself. A dredging scoop of the type illustrated in FIGS. 8. and 9 also may be used to reduce the thickness to a layer that permits compaction.

The lime treatment may be applied to the contents of sewage sumps with equal efficiency as with oil well sumps. The material is converted into an earth-like material which can be handled in much the same fashion as the oil sumps. Upon taking it to a dump site and compacting it the material can be converted into a hard, self-sealing type of material which does not ooze into the surrounding ground and does not appreciably leach out.

With regard to sumps wherein the sewage solids have been dehydrated and stored, the first step is to kill the sewage odor which makes the sump objectionable. Usually such sumps are covered with plastic sheet or other impervious sheet to confine the smell. If the dehydrated solids are too stiff to work with the equipment of FIGS. 1–4, water is added to form a sufficent plastic state that lime can be injected into the material. For some reason not presently known, the addition of a small amount of lime in the range of 10 to 15 pounds per cubic yard of sewage sludge kills the odor. Thereafter additional lime may be added to the contents, up to a maximum of 50 pounds per cubic yard of sludge. This amount of lime causes the sewage sludge to stiffen and then stabilize and causes it to turn into pellets about the size of golf balls. This material may be handled by any conventional earth-moving equipment and then may be safely moved on the highways, through towns, without any objectionable odor or other objection. When taken to the dump site the material may be laid in suitable layers and thereafter compacted. After several weeks this compacted material seems to form a self-sealing cement which sheds ground water and thereby reduces the leaching of the sewage contents into the soil.

Quantities by 1-½% to 5% of the lime chemical composition injected into the waste materials by weight creates the following physical characteristics:
1. Reduction of plasticity index, dropping sharply as much as three or more fold in some instances.
2. Clay binder content decreases substantially (agglomerating effect).
3. Stabilizing action occurs even with over-optimum moisture content.
4. The lineal shrinkage and swell decrease markedly.
5. Compression strength increases considerably.
6. Load bearing values increase substantially.
7. Treated waste materials form water resistent barrier against both surface and capillary moisture, and sheds water even if only moderatly compacted and graded.
8. Reduces water soluble carbonate content of oil base sludges and oil base chemicals, this reduction being caused by the calcium level in the lime chemical composition.
9. Deodorizes waste materials upon the initial injection of lime.

Figure 16:
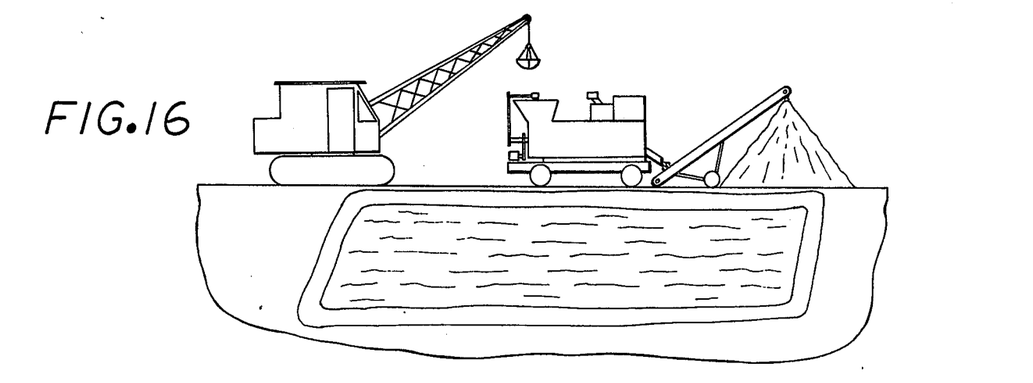
FIG. 16 is a diagrammatic view of the second form of apparatus disposed adjacent to a sludge sump and a power operated clam shell sequentially removing quantities of sludge from the sump and depositing the same in the hopper of the apparatus to be transformed by calcium oxide to a solid friable substantially odor free reaction product.

A second form of apparatus B is shown in FIG. 14 that includes a housing 100 that has forward and rearward ends 102 and 104, on top 106 and bottom 108. The housing 100 is supported on a base 110 that may either be stationary or mounted on skids or wheels (not shown) to permit the apparatus to be moved from location to location as desired. In FIG. 16 the apparatus B is illustrated as having been moved to a position adjacent a sludge sump 14.

The housing 100 is illustrated as of such shape as to define an elongate substantially horizontal confined space 110 that at the rearward end thereof is in communication with first and second upwardly extending hoppers 112 and 114, but this space 110 may be vertical if desired. The first hopper 112 is adapted to receive sludge 116 to be treated. The sludge 116 is delivered to first hopper 112 by conventional means 118 such as pumps, screw type conveyors, clam shells or the like. The second hopper 114 is adapted to receive calcium oxide 120 by conventional means 122 from hoppers or bins thereof (not shown). First and second adjustable gates 122a and 124a are operatively associated with the first and second hoppers 112 and 114 in such a manner that the rate of flow of sludge 116 and calcium oxide 120 by gravity to the reaward end of the confined space 110 may be controlled. Should it be desired sludge 116 and calcium oxide 120 may be delivered to the first and second hoppers 112 and 114 by conventional means such as screw conveyors (not shown).

An elongate shaft 126 is longitudinally disposed in the confined space 110 and is rotatably supported by forward and rearward sealed bearings 128 and 130 that occupy fixed positions relative to the forward and rearward ends 102 and 104 of housing 100. Shaft 126 has a number of longitudinally spaced screw paddles 132 projecting outwardly therefrom or other means for concurrently moving and agitating the mixture in the confined space.

A geared down prime mover 134 by conventional power transmission means 136 rotates the shaft 126 and paddles 132. The shaft 126 as it rotates drives a second transmission means 135 of conventional design that in turn rotates a horizontal shaft 137. Shaft 137 is connected to a gear box 138 that drives a downwardly extending shaft 140 that is disposed in first hopper 112. Shaft 140 supports aggitator blades 142 on the lower end thereof. The rotation of blades 142 assures thorough mixing of the sludge 116 prior to the sludge flowing to the confined space 110.

Steam 144 that develops during the operation of the second form of apparatus B is drawn upwardly through an opening 146 in housing 100 by operation of a power driven fan 148 of conventional design. Air from fan 148 and steam 144 are directed through a passage 150 into a compartment 152. The air and steam 144 as they flow through compartment 152 are subjected to a fine water spray 154 from water fogger nozzles 156.

Solid particles entrained with the steam 144 drop downwardly with the fine spray 154 into a catch basin 158 that forms the bottom of compartment 152. The steam 144 after being subjected to the sprays 154 flows through a filter 160 that defines the forward end of compartment 152 to the ambient atmosphere. Spray that drops into the catch basin 158 is discharged therefrom by a drain line 162 to a suitable disposal source, or if desired, the water flowing through the line 162 may be filtered by conventional means (not shown) and recycled through the nozzles 156 by conventional power driven pump equipment.

The sludge 116 to be transformed to a reaction product 164 preferably has a water content of not over 75 percent (75%) by weight. If the sludge has over 75 percent (75%) by weight of water it is preferably pretreated in a hopper (not shown) with thickening agents added thereto and thoroughly mixed therewith, prior to feeding into hopper 112.

The sludge 116 containing at least 25 percent (25%) solid particles may have an industrial or municipal origin, and includes such diverse materials as hydrocarbon mixtures from oil well sumps, sewage, hazardous marine silt and the like.

Immediately upon the sludge 116 and calcium oxide being brought into physical contact in the rearward portion of the confined space 110, an exothermic reaction is initiated that is of a complex nature that includes the start of neutralization of the sludge, the agglomeration of the sludge and a base exchange action occurring. The heat of the exothermic reaction is such that substantial heat is evolved from the sludge-calcium oxide mixture as it is agitated by rotation of the paddles 132. The dissolving the calcium oxide in water present in the sludge results in the dehydration of the latter due to evolution of steam.

Concurrently with the dehydration, the pH of the sludge-calcium oxide mixture starts to rise, and this change in pH to not less than 12.4 together with the elevated temperature resulting from the exothermic reaction destroys bacteria and virus present in the sludge 116. As the exothermic reaction proceeds, hydrates form, and there hydrates cooperating with particles of solids in the sludge to provide a reaction product that is agglomerated, solid, friable and substantially odor free. Soluble toxic salts of metals such as cadmium, chromium, arsenic, lead and zinc that maybe present in the sludge 116 are converted into insoluble compounds when subjected to the high pH that occurs in the confined space 110 as the sludge and calcium oxide react to form the solid agglomerated reaction product 164.

The length of the confined space 110 is critical as is the rate at which sludge 116 and calcium oxide are discharged into the rearward end thereof. The length of the confined space 110 must be so related to the rate at which the sludge-calcium oxide is moved therethrough that the exothermic reaction is substantially completed prior to the reaction product 164 reaching an opening 166 in the forward end 102 through which the reaction product 164 discharges. The reaction product 164 as it discharges from opening 166 is hot and steaming. The hot and steaming reaction product 164 is transported after discharge from opening 166 to a stock pile (not shown) by conventional conveyor means (not shown).

The objectionable odor of sewage sludge is substantially eliminated during the process of forming the reaction process due to the bacteria that cause the odor being destroyed, and the reaction product providing a hostile environment for the further growth of bacteria due to the high pH of the reaction product.

The reaction product 164 is a solid, frangible agglomerate that may by pressure be compacted to a dense material that may be used for landfill purposes, to provide a base for roadbeds, and if neutralized with acid may be used for agricultural purposes.

Figure 15:
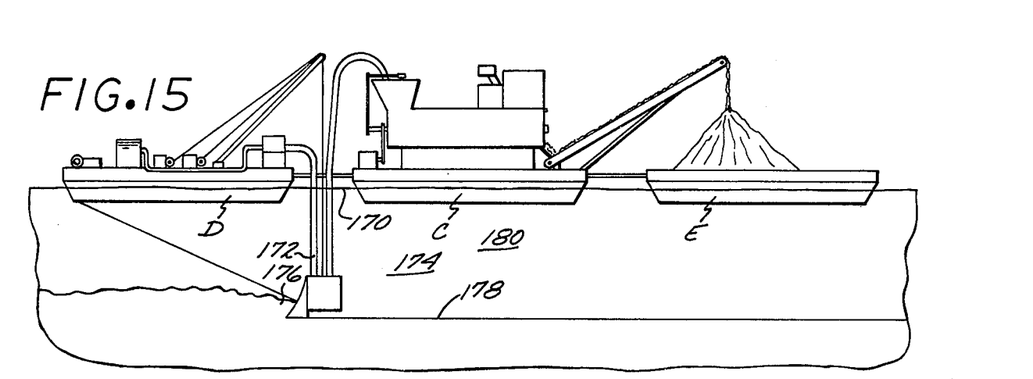
FIG. 15 is a diagrammatic view of the second form of apparatus mounted on a first barge to receive silt from a dredge, and transform the silt into said reaction product that is delivered to a second barge.

In FIG. 15 the apparatus B is shown mounted on a first barge C that is connected by conventional means 170 to a second barge D from which a dredge apparatus 172 extends downwardly in a body of water 174 to remove silt and organic waste products 176 from the bottom 178 of a body of water 180. The dredge apparatus 172 illustrated is one manufactured by Pneuma Spa, Via Por, 3, Maria, 4, Firenze, Italy. The dredged material 176 is discharged through a suitable conduit 181 to the first hopper 112 of the apparatus B mounted on the first barge C. The reaction product 166 is discharged from apparatus B onto a conventional power operated conveyor 182 that extends from the first barge C to a third barge E.

In FIG. 16 the apparatus B is shown in a position adjacent a sludge sump 14, with a power operated clam shell unit F sequentially removing quantities of the sludge 116 from the sump and depositing the same in the first hopper 112 of the apparatus B to be transformed into the reaction product 116 previously described. However, conventional equipment such as a screw conveyor may be used if desired. This operation is continued until a desired portion of the sludge 116 has been removed from sump 14.

The use and operation of the various forms of the invention have been described previously in detail and need not be repeated.

I claim:

1. A method of transforming aqueous organic material containing sludge that may include virus and odor forming bacteria and toxic soluble compounds that are converted to substantially insoluble compounds in an alkaline environment into a solid, friable, and substantially odor free reaction product, said method comprising the steps of:
   a. sequentially moving said sludge from a source thereof at a first rate;
   b. sequentially moving calcuim oxide from a source thereof at a second rate, with said second rate so related to said first rate that when sludge and calcium oxide are mixed an exothermic reaction is initialed in which said sludge and calcium oxide react with the evolution of steam to form a solid, friable, substantially odor free reaction product that has a pH of at least 12 and in which bacteria and virus intially present in said sludge are deactivated by said pH and the heat of said exothermic reaction, and said soluble toxic compounds initially present in said sludge are transformed to substantially water insoluble compounds due to the high pH of the mixture of said sludge and calcium oxide as they transform to said reaction product;
   c. providing an elongate confined space that has first and second ends;
   d. directing said sludge and calcium oxide at said first and second rates into said first end of said confined space;
   e. concurrently mixing and moving the mixture of said sludge and calcium oxide in said confined space from said first end towards said second end thereof, with the rate of longitudinal movement of said mixture in said confined space being such that said exothermic reaction has transformed said mixture to said reaction product by the time said reaction product has reached said second end;

f. withdrawing said steam from said confined space; and g. sequentially removing said reaction product from said second end of said confined space.

2. A method as defined in claim 1 in which said mixture is concurrently mixed and moved longitudinally in said confined space by rotating a number of longitudinally spaced, transversely and angularly disposed rigid surfaces within the confines of said confined space.

3. The method as defined in claim 1 which includes the further step of:

h. adding a thickening agent to said sluge prior to moving said sludge at said first rate, with said thickening agent being added in a sufficient amount that said sludge contains at least 75 percent solids by weight.

4. The method as defined in claim 3 in which said thickening agent is fly ash.

5. The method as defined in claim 1 in which said confined space is of such depth that a longitudinally extending space is provided in said confined space into which said steam can accumulate, and said longitudinally extending confined space in communication with a passage through which said steam may flow to the exterior of said confined space.

6. The method as defined in claim 5 which includes the further step of:

h. blowing a stream of air across said passage and substantially normal thereto to withdraw said steam from said longitudinally extending space.

7. The method as defined in claim 6 which includes the further step of:

i. directing the mixture of air and steam through a spray of water to remove foreign particled material from said steam prior to said air and uncondensed steam being discharged to the ambient atmosphere.

8. The method as defined in claim 2 which includes the further step of:

j. recovering said spray and condensed steam and recycling the same to form said spray to minimize a waste of water.

9. The method as defined in claim 7 which includes the further step of:

j. filtering said air and steam after it has been subjected to said spray to substantially remove entrained particles of sludge, calcium oxide and said reaction product from said steam and air prior to the latter being discharged to the ambient atmosphere.

10. The method as defined in claim 1 which includes the further step of:

j. agitating said sludge prior to moving the same at said first rate to obtain a thorough and substantially uniform distribution of solid particles in said sludge throughout the water that forms a part of said sludge.

11. The method as defined in claim 1 in which said sludge is sewage sludge.

12. The method as defined in claim 1 in which the major portion of said sludge is waste petroleum hydrocarbon material.

13. The method as defined in claim 1 in which the major portion of said sludge is of marine origin.

14. The method as defined in claim 1 in which said sludge contains marine silt.

15. The method as defined in claim 1 in which said sludge is obtained from the bottom of a body of water, and said method being carried out on the surface of said body of water.

* * * * *

US004079003B1

REEXAMINATION CERTIFICATE (3904th)

United States Patent [19]
Manchak

[11] B1 4,079,003
[45] Certificate Issued *Oct. 19, 1999

[54] METHOD OF TRANSFORMING SLUDGE INTO ECOLOGICALLY ACCEPTABLE SOLID MATERIAL

[76] Inventor: Frank Manchak, 731 El Rancho Rd., Santa Barbara, Calif. 93108

Reexamination Request:
No. 90/004,810, Oct. 17, 1997

Reexamination Certificate for:
Patent No.: 4,079,003
Issued: Mar. 14, 1978
Appl. No.: 05/691,855
Filed: Jun. 1, 1976

[ * ] Notice: This patent is subject to a terminal disclaimer.

Related U.S. Application Data

[63] Continuation-in-part of application No. 05/406,349, Oct. 15, 1973, Pat. No. 4,028,240.

[51] Int. Cl.$^6$ ..................................................... C02F 11/14
[52] U.S. Cl. .......................... 588/205; 210/714; 210/747; 210/764; 588/236; 588/258; 588/901
[58] Field of Search ..................................... 210/714, 747, 210/751, 764; 588/205, 236, 258, 901; 95/187, 189, 196

[56] References Cited

U.S. PATENT DOCUMENTS

| Re. 29,783 | 9/1978 | Smith et al. . |
| 141,848 | 8/1873 | Andrews . |

(List continued on next page.)

FOREIGN PATENT DOCUMENTS

| 1 806 732 | 5/1970 | Germany . |

OTHER PUBLICATIONS

Dean and Smith, "Disposal and Recycling of Wastewater Sludges Containing Lime", 3d Int'l Lime Conf., May, 1974.
Farrell et al., "Lime Stabilization of Primary Sludges", Journal WPCF, vol. 46, No. 1, Jan. 1974.

(List continued on next page.)

*Primary Examiner*—Christopher Upton
*Attorney, Agent, or Firm*—Squire, Sanders & Dempsey L.L.P.

[57] ABSTRACT

Sludges in the form of aqueous suspensions of organic and inorganic materials that range in viscosity from thick viscous pastes to flowable liquids are produced in the operation of numerous industries and also as waste by municipalities. The apparatus and method of using the same that are the subject of the present invention are directed to transforming the sludge to solids both in sumps in which they may be situated as well as apart from such sumps or storage areas or from continuous sources. The apparatus of the present invention as aqueous sludge is sequentially removed from a sump, storage area, or from continuous sources mixes calcium oxide therewith at a predetermined rate within a confined space. The predetermined rate is such that the exothermic reaction between the calcium oxide and water in the sludge raises the temperature of the sludge-calcium oxide mixture to the extent that substantial steam is produced. The predetermined rate is also such that substantial hydrolysis and saponification of the sludge occurs, and the PH of the sludge-calcium oxide mixture being not less than 12.4. The elevated temperature that occurs in the confined space and the high pH results in the destruction of virus and bacteria in the sludge, and the almost instant destruction of objectionable odors from the sludge. The transformed sludge is in a solid particled state that can be compacted for construction and land fill purposes, and when neutralized may be used for agricultural purposes. Toxic compounds of metals such as cadmium, chromium, arsenic, zinc and the like that were initially present in the sludge are transformed into insoluble compounds by the high pH previously mentioned, and as a result these metals will not leach out when the transformed sludge is used for landfill, roadfill construction or agricultural purposes, and other end uses presently being developed.

U.S. PATENT DOCUMENTS

| | | | |
|---|---|---|---|
| 918,744 | 4/1909 | Fryklind . | |
| 2,297,195 | 9/1942 | Behrinjer . | |
| 2,600,408 | 6/1952 | Komarek . | |
| 3,016,981 | 1/1962 | Fritz | 95/196 |
| 3,030,222 | 4/1962 | Eichenlaub . | |
| 3,342,731 | 9/1967 | Baumann . | |
| 3,353,334 | 11/1967 | Bergman | 95/196 |
| 3,476,683 | 11/1969 | Liljegren . | |
| 3,796,658 | 3/1974 | Meissner, Sr. . | |
| 3,870,535 | 3/1975 | Minnick et al. . | |
| 3,877,920 | 4/1975 | Carlberg . | |
| 3,915,853 | 10/1975 | Luck . | |
| 4,028,130 | 6/1977 | Webster et al. . | |
| 4,028,240 | 6/1977 | Manchak, Jr. . | |

OTHER PUBLICATIONS

Doyle, "Effectiveness of High pH for Destruction of Pathogens in Raw Sludge Filter Cake", Ky–Tn WPCA, Sep. 1965.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–15 is confirmed.

* * * * *